United States Patent [19]

Heiser

[11] 3,949,138

[45] *Apr. 6, 1976

[54] COATINGS CONTAINING PLASTIC POLYMERIC PIGMENTS

[75] Inventor: Edward J. Heiser, Midland, Mich.

[73] Assignee: The Dow Chemical Company, Midland, Mich.

[ * ] Notice: The portion of the term of this patent subsequent to Dec. 18, 1990, has been disclaimed.

[22] Filed: Sept. 19, 1974

[21] Appl. No.: 507,519

Related U.S. Application Data

[63] Continuation of Ser. No. 268,897, July 3, 1972, Pat. No. 3,853,579, which is a continuation-in-part of Ser. No. 732,100, May 27, 1968, Pat. No. 3,779,800.

[52] U.S. Cl. ..... 428/323; 260/17.4 ST; 260/29.6 R; 428/336
[51] Int. Cl.$^2$ .......................................... B32B 5/16
[58] Field of Search......... 117/15, 38, 155 UA, 156, 117/161 UB; 260/17.4 ST, 29.6 R; 428/323, 336

[56] References Cited
FOREIGN PATENTS OR APPLICATIONS 813,548  5/1959  United Kingdom
1,043,541  9/1966  United Kingdom

*Primary Examiner*—Michael R. Lusignan
*Attorney, Agent, or Firm*—M. S. Jenkins

[57] ABSTRACT

A light weight coating comprising a convenient binder such as starch and small colorless plastic, polymeric particles which remain discrete and retain a diameter of about one wavelength of visible light. The coating, prepared by dispersing the plastic, polymeric particles in an aqueous media containing the binder, may then be applied to a paper substrate in a conventional manner.

16 Claims, No Drawings

COATINGS CONTAINING PLASTIC POLYMERIC PIGMENTS

CROSS REFERENCES TO RELATED APPLICATIONS

This invention is a continuation of Ser. No. 268,897 filed July 3, 1972, now U.S. Pat. No. 3,853,579, patented Dec. 10, 1974, which is a continuation-in-part of application Ser. No. 732,100 filed May 27, 1968 now U.S. Pat. No. 3,779,800, patented Dec. 18, 1973.

BACKGROUND OF THE INVENTION

This invention relates to lightweight paper coatings having high opacity and visual gloss. More particularly, it relates to lightweight coatings containing discrete plastic, polymeric particles having diameters in the range from about 0.3 to about 0.8 micron.

Most paper surfaces require a coating in order to have good printing qualities and sufficient opacity or hiding power. Conventional paper coatings contain inorganic pigments such as kaolin clay or titanium dioxide to give the coated substrate the opacity required. These inorganic pigments substantially increase the coating weight whicn in turn increase the cost of mailing substrates so coated.

Paper coatings which contain bubbles as substitutes for inorganic pigments have been described in U.S. Pat. No. 3,108,009. These coatings are prepared by dispersing a high boiling immiscible liquid in the binder media and then evaporating the dispersed liquid after the coating has been applied to the substrate. It is desirable in the exercise of this method to recapture the evaporated liquid in order to reduce the costs of the coating. Also, according to this method it is preferable to apply a layer of varnish to the coating containing the air spaces to make the surface more suitable for printing.

Paper containing expanded microspheres of plastics has been described in U.S. Pat. No. 3,293,144, but these expanded microspheres are considerably larger than a wavelength of visual light. Generally this kind of paper is used primarily in areas where a high degree of opacity is not required.

SUMMARY OF THE INVENTION

An object of this invention is to provide a light weight coating which upon application to a paper substrate yields a surface which has printing qualities comparable to a surface coated with an inorganic pigment.

Another object is to produce a coating which upon application to the paper substrate yields a level surface having a high visual gloss and brightness.

An even further object is to produce a coating having a higher degree of resistance to blistering than papers coated with mineral pigment, particularly when printed by web offset printing processes using heat set inks.

Other objects and advantages of the invention will be evident from the following description.

The objects of this invention have been accomplished by applying a novel coating to a suitable substrate, said coating comprising a binding amount of a suitable binder and an opacifying amount of a pigment, at least a portion of which is in the form of discrete, substantially spheroidal, plastic, polymeric particles having an average diameter in the range from about 0.3 micron to about 0.8 micron. An opacifying amount of the pigment is that amount which imparts a degree of opacity comparable to that obtained in conventional paper coatings using inorganic materials such as clay as pigment. A binding amount of binder is that amount which binds the pigment to the coated paper substrate such that the pigment is not removed from the coated paper during normal handling and/or further processing, e.g., printing. The plastic, polymeric particles (hereinafter referred to as plastic particles) are substantially insoluble in the binder at temperatures necessary to finish the coated surface. The plastic particles also remain discrete and retain an average diameter in the range from about 0.3 to about 0.8 micron during the finishing process. The portion of plastic particles is an amount effective to provide a coating which is lighter in weight and/or has better opacity, brightness, gloss, or printing qualities such as gloss ink holdout, uniform ink receptivity or blister resistance than do similar coatings employing the same binder and containing only inorganic materials such as clay as pigment.

DESCRIPTION OF PREFERRED EMBODIMENTS

The discrete plastic particles useful as part or all of the pigment in coating compositions of this invention comprise any non-film forming organic polymer which is water-insoluble and is insoluble in the particular binder to be used in the coating composition. It is therefore understood that any polymer having the critical physical characteristics described herein serves suitably as the plastic portion of the pigment for the purposes of this invention. Preferred polymers are thermoplastic organic polymers. Especially preferred polymers are also classified as resinous and are substantially colorless.

In order that the plastic particles retain the discrete character necessary to give optimum light scattering (opacity), the particular polymer chosen must be non-film forming at the temperatures and pressures selected to dry or finish the coated surface. By "non-film forming," it is meant that the dispersed plastic particles do not coalesce to form a film at ambient temperature and at temperatures and pressures selected to dry or finish the coated article. While such temperature requirement varies with the type of finishing method used, it is preferred that the polymer in the form of the discrete, plastic particles not be film forming at temperatures of 140°F or less if the coated surface is to be finished by processes such as calendering or super calendering. In order to realize substantially improved gloss, it is sometimes desirable that the plastic particles at the surface of the coating be flattened or even fused to some degree by the calendering or super calendering process. However, the fusion or coalescence of the discrete plastic particles throughout the coating must be avoided; otherwise the light scattering properties (opacity) of the coated surface will be reduced substantially. Accordingly, polymers preferred for use as the plastic particles have a Vicat Softening Point, as defined and determined by ASTM D-1525-65-T, of greater than about 140°F. An especially preferred class of polymers includes polymers which are predominantly hydrocarbon. As an additional requirement in order to avoid fusion or coalescence, it is necessary that plastic particles not be dissolved or softened by the particular binder chosen.

Representative polymers which are suitable for the plastic particles include the non-film forming, water-insoluble, addition polymers of polymerizable ethylenically unsaturated monomers such as the monovinylidene aromatic monomers, saturated esters of $\alpha,\beta$- ethylenically unsaturated carboxylic acids, ethylenically unsaturated esters of non-polymerizable carboxylic acids, ethylenically unsaturated nitriles, aliphatic α-monoolefins, and other polymerizable and copolymerizable ethylenically unsaturated monomers. It is understood that in order to be suitable the monomer or monomers selected in preparation of the plastic particle must polymerize or copolymerize to form a non-film forming, water-insoluble polymer or copolymer as defined hereinbefore.

Exemplary monomers which are suitable employed alone or in combination with other monomers include such monovinylidene aromatic monomers as the carbocyclic types, e.g., styrene, α-methyl styrene, ar-methylstyrene, ar-methoxystyrene, ar-hydroxymethyl styrene, ar-t-butyl styrene, ar,ar-dimethylstyrene, ar-chlorostyrene, ar,ar-dichlorostyrene, ar-ethylstyrene, ar-cyanostyrene, ar-bromostyrene, ar-ethoxystyrene, ar-chloro-ar-methylstyrene, ar,ar-difluorostyrene, and vinyl naphthalene, and the heterocyclic varieties, e.g., vinyl pyridine. By "monovinylidene" is meant that to an aromatic ring in each molecule of monomer is attached one radical of the formula,

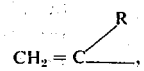

wherein R is hydrogen or lower alkyl, e.g., alkyl having 1 to 4 carbon atoms such as methyl, ethyl, n-propyl, n-butyl and iso-butyl. Also included are the saturated esters of α,β-ethylenically unsaturated carboxylic acids which polymerize to form non-film forming, water-insoluble polymers such as methyl methacrylate, chloroethyl methacrylate, 2-butyl methacrylate, 3,3-dimethylbutyl methacrylate, 3,3-dimethyl-2-butyl methacrylate, ethylmethacrylate, isobutyl methacrylate, isopropyl methacrylate, phenyl methacrylate, butyl chloroacrylate, cyclohexyl chloroacrylate, ethyl chloroacrylate, methyl chloroacrylate, 2-chloroethyl methacrylate, isopropyl chloroacrylate, isobutyl chloroacrylate and other such esters, particularly the alkyl esters wherein the alkyl moiety has from 1 to 20 carbon atoms and the acid moiety has from 3 to 8 carbon atoms. Exemplary ethylenically unsaturated esters of non-polymerizable carboxylic acids which polymerize to form non-film forming, water-insoluble polymers are vinyl benzoate, vinyl ar-toluate, vinyl ar-ethylbenzoate, allyl ar-ethylbenzoate, vinyl trimethylacetate, vinyl trichloroacetate and other such esters wherein the unsaturated ester moiety has from 2 to 14 carbon atoms and the acid moiety has from 2 to 12 carbon atoms. Other exemplary monomers include acrylonitrile, methacrylonitrile, fumaronitrile and other ethylenically unsaturated nitriles having not more than 12 carbon atoms and vinylic monomers such as vinyl chloride, vinyl pyrrolidone, vinyl carbazole and the like.

Lesser amounts, such as less than about 45 weight percent based on the polymer, of other ethylenically unsaturated monomers which normally polymerize to form film-forming polymers (so-called soft monomers) are suitably copolymerized with the foregoing hard monomers. Examples of such monomers include conjugated aliphatic dienes such as 1,3-butadiene, isoprene, 2-chloro-1,3-butadiene and other such dienes having not more than 14 carbon atoms; alkyl acrylates such as methyl acrylate, ethyl acrylate, propyl acrylate, n-butyl acrylate, isobutyl acrylate, amyl acrylate, lauryl acrylate, isoamyl acrylate, 2-ethylhexyl acrylate, octyl acrylate, and other such acrylates having alkyl moieties of not more than 18 carbon atoms; unsaturated esters of saturated carboxylic acids such as vinyl acetate, vinyl propionate, vinyl butyrate, allyl acetate and other such esters having not more than 18 carbon atoms; esters and half esters of α,β-ethylenically unsaturated polycarboxylic acids, e.g., dimethyl fumarate, diethyl maleate, methyl ethyl fumarate, ethyl hydrogen maleate, dioctyl fumarate and the like; aliphatic monoolefins such as ethylene, propylene and butene-1; other copolymerizable vinyl monomers containing a single polymerizable ethylenically unsaturated group such as vinyl fluoride, vinylidene chloride and vinylidene fluoride. Maximum concentrations of these monomers are governed primarily by the temperatures to be reached by the coating during the coating process and the degree to which a particular monomer lowers the softening point of the resulting copolymer. For illustration, if a copolymer of styrene and butadiene is to be used as the polymer in the plastic particles, butadiene normally is not present in the copolymer in amount more than about 20 weight percent. If, however, the styrene/butadiene copolymer has more than the normal amount of crosslinking, butadiene may be present in concentration greater than 20 weight percent with the maximum concentration of butadiene being dependent on the actual degree of crosslinking. Similarly, homopolymers of such monomers as ethylene may be rendered non-film forming and therefore suitable by introduction of crosslinking. Increased crosslinking is usually promoted by irradiation or by use of a suitable crosslinking agent such as unsaturated polyester or polyethylenically unsaturated monomer in amounts up to about 15 weight percent based on the polymer of the plastic particles. Exemplary polyethylenically unsaturated monomers include divinyl benzene, trivinyl benzene, divinyl naphthalene, and the like. In regard to the use of the aformentioned soft monomers, use in any concentration is suitable provided that the resultant polymer is non-film forming as required in the practice of this invention.

In addition to the foregoing monomers, other monomers which may also be copolymerized constituents of the polymeric pigment are α,β-ethylenically unsaturated carboxylic acids including both mono- and polycarboxylic, e.g., dicarboxylic, acids, such as acrylic acid, methacrylic acid, itaconic acid, fumaric acid, maleic acid and anhydride, citraconic acid and anhydride, aconitic and other such acids. Maximum concentrations of these acid comonomers in the polymeric pigment are limited by the degree to which they promote water solubility of the polymer. Since the plastic particles must be water-insoluble, the acid comonomers are generally employed in concentrations not greater than 25 weight percent of the polymeric pigment, although somewhat higher concentrations of acid comonomer may be used if the polymer is crosslinked or pH of the dispersing medium is controlled.

Other special purpose monomers such as the hydroxy alkyl acrylates, e.g., hydroxyethyl acrylate and hydroxypropyl acrylate and sulfo esters of α,β-ethylenically unsaturated carboxylic acids, e.g., 2-sulfoethyl acrylate, 2-sulfoethyl methacrylate are also suitably employed in the polymer of the plastic particles, usually in amounts less than about 8 weight percent based on the polymer.

The foregoing polymers are given as an illustrative sample of the total number of suitable polymers. For the purposes of this invention, plastic particles of any polymer which is water-insoluble and non-film forming can be suitably employed provided that the particles are discrete and have average diameter as specified hereinbefore.

Preferred addition polymers used in the plastic particle are polymers comprising from about 40 to 100 weight percent, advantageously from about 75 to about 99 weight percent, of one or more of the aforementioned ethylenically unsaturated monomers which homopolymerize to form non-film forming polymers, from about 0 to about 45 weight percent, advantageously from about 0 to about 20 weight percent on one or more of the aforementioned soft monomers and from about 0 to about 15 weight percent, advantageously from about 1 to about 5 weight percent, of one or more copolymerizable $\alpha,\beta$-ethylenically unsaturated carboxylic acids, preferably those having 3 to 8 carbon atoms. Of the preferred addition polymers, polymers comprising from about 40 to 100 weight percent of polymerized monovinylidene aromatic carbocyclic monomers and from 0 to about 60 weight percent of ethylenically unsaturated monomers copolymerized therewith in which from 0 to about 15 weight percent of the polymer comprises copolymerized $\alpha,\beta$-ethylenically unsaturated carboxylic acid. Especially preferred copolymers are copolymers comprising from about 50 to 100 weight percent, most advantageously from about 75 to about 99 weight percent, of monovinylidene carbocyclic aromatic monomers, e.g., styrene and ar-(t-butyl) styrene, from 0 to about 49 weight percent, most beneficially from 0 to about 20 weight percent, of $\alpha,\beta$-ethylenically unsaturated nitrile such as acrylonitrile and methacrylonitrile, and from about 0 to about 5 weight percent, most benefically from about 1 to about 4 weight percent, of $\alpha,\beta$-ethylenically unsaturated carboxylic acid such as acrylic acid, methacrylic acid and itaconic acid including combination thereof. Examples of such especially preferred copolymers are styrene/acrylic acid copolymers, styrene/acrylonitrile/itaconic acid copolymers, styrene/methacrylic acid copolymers, and t-butyl styrene/acrylonitrile/acrylic acid copolymers. Also preferred are vinyl chloride/acrylic acid copolymers and vinyl benzoate/acrylic acid copolymers. In the foregoing preferred copolymers, it is sometimes beneficial to copolymerize from about 1 to about 15 weight percent of polyethylenically unsaturated monomer such as divinyl benzene therewith.

As suitable alternative to foregoing addition polymers, non-film forming condensation polymers which are water-insoluble and insoluble in the binder are also advantageously employed. Exemplary suitable condensation polymers include:

polyesters, e.g.,
  poly(ethylene terephthalate),
polyesters, e.g., (Continued)
  poly(propylene terephthalate),
  poly(ethylene 1,5-naphthalate),
  poly(ethylene 2,7-naphthalate),
  poly(ethylene isophthalate),
  poly[ethylene 4,4'-(2,2-butylidene) dibenzoate];
polycarbonates e.g.,
  poly(4,4'-butylidenediphenylene carbonate),
  poly(4,4'-isopropylidenediphenylene carbonate);
polyanhydrides, e.g.,
  poly(4,4'-methylenebenzoic anhydride),
  poly(isophthalic anhydride);
polyamides, e.g.,
  poly(hexamethylene pimelamide),
  poly(hexamethylene azeloamide),
  poly(hexamethylene adipamide),
  poly(7-aminoenanthic acid).

The specific gravity of the polymers used in the practice of the invention usually is within the range from about 0.9 to about 1.6, preferably within the range from about 0.9 to about 1.4. In order that the coating be considerably lighter in weight than coatings containing inorganic pigments, it is preferable that the particles be made from a polymer which is predominantly hydrocarbon since such polymers have a specific gravity generally less than about 1.2. The refractive index of preferred polymers is generally in the range of from about 1.2 to about 1.7, especially from about 1.4 to about 1.6.

In addition to being composed of non-film forming polymer as set forth hereinbefore, it is critical that the plastic particles have an average diameter in the range of from about 0.3 to about 0.8 micron. By "average diameter" is meant the number average particle diameter. Preferably, the plastic particles have a particle diameter distribution typical of most essentially monosperse or monomodal systems. Suitably, however, the plastic particles have a sufficient number of particles having diameter within and near the range from about 0.3 to about 0.8 micron that the plastic particles are as efficient as an opacifier as clay on an equal volume basis. Preferably at least 50 volume percent of the plastic particles are within the range from about 0.2 to about 0.9 micron, most preferably at least 70 volume percent are within said range. It has been observed that differences in refractive index and differences in particle shape, particle surface characteristics and/or particle packing can cause different samples of plastic particles having essentially the same average particle diameter to possess different pigmenting efficiencies (e.g., opacifying efficiencies). It is generally found, however, that samples of non-film forming plastic particles having average diameters within the aforementioned range have pigmenting efficiencies which are about equal to or even better than the pigmenting efficiency of clay on a volume basis. Clay is the pigment most commonly employed in paper coatings, and therefore is useful in setting a standard of acceptability for a pigment in the paper coating art.

These particles may be prepared by emulsion polymerization of a suitable monomer or mixture of such monomers or by emulsifying a suitable polymer produced by another method such as bulk or solution polymerization. For example, in a typical emulsion polymerization procedure, the monomeric components of the polymer are dispersed in an aqueous solution containing an emulsifier and an electrolyte. A water-soluble free radical type catalyst is added to the dispersion to initiate the polymerization, and the mixture is agitated until the polymerization is completed. The size of the particles is controlled by known means such as varying the amount of emulsifier and electrolyte in the system and/or time of addition of same. For example, as the amount of emulsifier is increased, the particle size is decreased. The amount of emulsifier and electrolyte needed to give a particle having the proper size may vary according to the particular polymer being formed.

Any binder of a type conventionally employed in aqueous coating compositions adapted to a paper coating process to provide an adherent, smooth, layer suitable for printing is suitable for the purposes of this invention. Exemplary suitable binders include the natural binders such as modified starch, soy bean protein and casein and commonly known synthetic binders.

Suitable modified starch binders include oxidized, enzyme converted, cationic, thermal-converted and hydroxy-ethylated varieties.

Suitable synthetic binders include any water-dispersible organic synthetic polymer which is film-forming at ambient temperature and which is a non-solvent for the plastic pigment. Preferred synthetic binders are water-insoluble addition polymers having an apparent second order transition temperature (Ti) of not more than about 30°C, preferably from about −40°C to about 0°C. Exemplary preferred binders are latexes or aqueous dispersions of polymers such as polymers of conjugated dienes such as butadiene, chloroprene and isoprene, e.g., styrene/butadiene copolymer, butadiene/acrylonitrile copolymer, styrene/isoprene copolymer, butadiene/methyl methacrylate copolymer, polybutadiene, polyisoprene, polychloroprene and the like; polymers of alkyl esters of $\alpha,\beta$-ethylenically unsaturated carboxylic acids such as acrylate esters, e.g., ethyl acrylate/acrylic acid copolymers, methyl acrylate/itaconic acid copolymers, ethyl acrylate/hexyl acrylate/methacrylamide copolymers, alkyl acrylate/vinyl acetate copolymers, styrene/alkyl acrylate copolymers; vinyl chloride/vinylidene chloride copolymers; and the like. Suitable binders include aqueous dispersions or solutions of such polymers as polyvinyl acetate, polyvinyl alcohol, vinylidene chloride copolymers, ethylene/vinyl acetate copolymers, cellulosics such as methyl cellulose and carboxymethyl cellulose and others commonly used as pigment binders, particularly in conventional paper coating formulations. Also suitable are mixtures of two or more natural binders, two or more synthetic binders and mixtures of one or more synthetic binders with one or more natural binders.

The paper coating of the invention is advantageously prepared by dispersing the pigment at least a portion of which is plastic particles in an aqueous medium containing the binder. Preferably the plastic particles are added in the form of a latex in the dispersing step. Suitable binder/pigment ratios require sufficient binder to bind the pigment to the paper such that pigment is not removed from coated paper substrate during normal handling, e.g., printing, etc. Suitable ratio also requires sufficient pigment (inclusive of plastic particles and optional inorganic pigment) to opacify the coated paper substrate. Generally ratios of binder to pigment (inclusive of plastic particles and optional inorganic pigment) are in the range from about 1.3 to about 12 volume parts of binder to about 38.8 volume parts of pigment. Preferred ratios are in the range from about 6 to about 10 volume parts of binder to about 38.8 volume parts of pigment. In a coating of a starch binder having a specific gravity of 1.5 and a pigment having a specific gravity of about 1.05, e.g., a pigment consisting of non-porous polymerized styrene particles, the range of suitable volume ratios from about 1.3 to about 12 volume parts of binder to 38.8 volume parts of pigment corresponds to a weight ratio of about 2 to about 17 weight parts (dry basis) of binder to 40.7 parts (dry basis) of pigment. In order to completely eliminate effect of change of specific gravity of either or both of binder and pigment, the ratio of binder to pigment is stated on a volume basis.

It should be clearly understood that the pigments employed in the paper coating invention includes a combination of inorganic pigment and the plastic particles. In such combination the plastic particles are used in an amount which is effective to lower coating weight and/or to enhance the coating properties of gloss, pick resistance, printing qualities, brightness or the like as compared to a coating containing only the inorganic pigment as pigment. Preferably, the plastic particles constitute at least about 1 volume percent of the total pigment.

Exemplary inorganic pigments which are suitable for the purposes of this invention include clays such as kaolinite and other materials such as titanium dioxide, kieselguhr, calcium carbonate, calcium sulfate, calcium sulfite, barium sulfate, blanc fixe, satin white, aluminum hydrates and zinc pigments, e.g., zinc oxide, zinc sulfide and lithopone. More generally, any inorganic pigment which is a satisfactory pigment in conventional paper coatings is a suitable inorganic pigment in the practice of this invention.

The coating is applied to a paper substrate by a conventional technique such as air knife, trailing blade, inverted blade, roll coaters and the like.

After the coating is applied, the surface of the substrate is dried and often is then finished by calendering or supercalendering. It is critical that the temperature of the coating does not exceed the softening point of the plastic particles, otherwise the particles will lose their discrete character or proper size and shape. When this occurs, the opacity and brightness of the coated surface drops substantially.

The drying times required by the coating containing the plastic particles are not as long as those required by coatings containing the inorganic pigments. Also the paper substrate coated with the plastic particles has a better finish and higher visual gloss than paper coated with an inorganic pigment.

Where the solvent sensitivity of particles of a specific plastic polymer presents a problem, a coating containing the plastic particles may be applied to the paper substrate as a base coating and such base coating is subsequently coated with a coating containing an inorganic pigment which is not as sensitive to solvent. Since by that procedure much less coating containing the inorganic pigment will be required to yield a surface with the desired gloss and opacity, the total coating weight is usually reduced about 25 percent. Solvent sensitivity can also be overcome by introducing some crosslinking into the polymer of plastic particles.

The following examples illustrate the invention, but are not to be construed as limiting its scope. Except as indicated, all parts and percentages are by weight. Weight parts and volume parts are calculated on dry solids basis.

EXAMPLE 1

A blend is prepared of an aqueous dispersion of oxidized starch and a latex of polystyrene, the particles of which having an average diameter of 0.5 micron as determined by electron microscope, in a ratio of 15 parts (10.5 volume parts) of starch and 38.5 parts (38.8 volume parts) of polystyrene particles calculated on a dry basis, and the solids content of the blend is adjusted to 43.5 percent. The mixture is then applied with a drawdown bar to a polished black glass plate and air dried at room temperature. Five square inches of the applied coating is removed and weighed. This weight is compared with the weight of a coating applied in the same manner but containing kaolin clay having a solids content of 51.5 percent. The clay coating has a ratio of 10 volume parts oxidized starch to 38.8 volume parts clay. In each test sufficient coating was applied to achieve a brightness of 70. Brightness is determined by TAPPI Test Method T452-M-58. The results of this comparison are shown in the following table.

TABLE I

|  | I(C)* | I |
|---|---|---|
| Polystyrene "Pigment" parts by weight (dry) | — | 38.5 |
| Kaolin clay, parts by weight (dry) | 100 | — |
| Oxidized Starch, parts by weight (dry) | 15 | 15 |
| Coating weight, grams/ 5 sq. inches | .122 | .069 |

*Not an example of the invention

EXAMPLE 2

A coating color, hereinafter designated II, is made according to Example 1, containing 10 parts (7.05 volume parts) on a dry basis of oxidized starch and 38.5 parts (38.8 volume parts) on dry basis of latex of polystyrene having an average diameter of 5,000 Angstroms is applied to a paper substrate by a puddle type trailing blade, double coating with drying in a circulating oven after each coat. A coating color (not an example of the invention), hereinafter designated II(C), containing 100 parts (38.8 volume parts) on dry basis of kaolin clay and 15 parts (10.0 volume parts) on dry basis of oxidized starch is similarly applied to a second portion of the same paper substrate. The results are shown in the following table for comparison purposes.

TABLE II

|  | COAT DATA | |
|---|---|---|
|  | II(C)* | II |
| Polystyrene "Pigment" parts by weight (dry) | — | 38.5 |
| Kaolin clay, parts by weight (dry) | 100 | — |
| Starch, parts by weight (dry) | 15 | 10 |
| % Solids | 57.5 | 43.5 |
| Coating Speed | 600 ft/min | 600 ft/min |
| Oven Temperatures | 300°F | 300°F |
| Coating Properties (supercalendered 6 nips at 1200 pli). | | |
| 75° Gloss[1] | 43 | 56 |
| Brightness[2] | 74.5 | 77 |
| Opacity[3] | 92.7 | 91.6 |
| K&N Ink, % Drop[4] | 34.3 | 52 |
| IGT Dry Pick[5] No. 6 Ink (Ft./min.) | 270 | 280 |
| Coating Weight Lbs./ream (25×38-500) | 8.3 | 3.9 |

*Not an example of the invention.
[1]Gloss is determined by TAPPI Test Method T480TS-65.
[2]Brightness is determined by TAPPI Test Method T452-M-58.
[3]Opacity is determined by TAPPI Test Method T425-M-60.
[4]K&N Ink is measured according to TAPPI Test Method RC-19.
[5]IGT Picking Resistance is measured according to TAPPI Test Method T499 su 64.

EXAMPLE 3

A single base coating color of composition II of Example 2 is applied to a portion of the same paper substrate used in Example 2 by a puddle type trailing blade. This base coating is dried and then a single finish coating of composition II(C) of Example 2 is applied to the dry base coating by a puddle type trailing blade. The results, obtained by the same testing methods used in Example 2, are shown in the following table.

TABLE III*

| 75° Gloss | 33 |
|---|---|
| Brightness | 74.5 |
| Opacity | 93.3 |
| K&N Ink, % Drop | 43 |
| IGT Dry Pick, ft/min No. 6 Ink | 300 |
| Coating Weight Lbs/ream (25×38-500) | 6.0 |

*The same testing methods used in Example 2 are used in this example.

EXAMPLE 4

Substantially the same results are obtained when for the polystyrene pigment of Example 2 there is substituted the same quantity of a copolymer of 92 percent of styrene, 6 percent of acrylonitrile, and 2 percent of itaconic acid in the form of approximately spherical particles having an average diameter of about 5,000 Angstroms.

EXAMPLE 5

Substantially the same results are obtained when for the polystyrene pigment of Example 2, there is substituted the same quantity of a copolymer of 89 percent by weight of styrene, 6 percent by weight of acrylonitrile, 3 percent by weight of β-hydroxyethyl acrylate and 2 percent by weight of itaconic acid in the form of approximately spherical particles having an average diameter of about 5,000 Angstroms.

EXAMPLE 6

Several coating compositions are prepared using starch as binder and styrene polymer particles as pigment. The particles of the coating compositions have average diameters as indicated in Table IV. The several coating compositions have a ratio of 38.5 weight parts (38.8 volume parts) of polymer particles to 10 weight parts (7 volume parts) of starch. The weight parts are measured on a dry basis. Equal portions of the compositions are applied to black glass plates in amount sufficient to form films having wet thicknesses of 1-½ mils and to white glass plates in amounts sufficient to form films having wet thicknesses of 3 mils and are air dried at room temperature. Brightnesses for the coated black glass plates and coated white glass plates are determined according to TAPPI Test Method T452-M-58. Five square inch portions of the coatings applied to the black glass plates are removed and weighed. Scattering coefficients for the coatings are then calculated from the values of brightness and coating weights using the equation:

$$\text{Scattering coefficient} = \frac{ST}{220\ A}$$

wherein ST is a value read directly from Mitton-Jacobsen Graphs plotting the ST value against reflectance of the coating over black and white glass plates and A is the weight in grams of a five square inch of coating. Reflectance is equal to 0.01 × brightness. The Mitton-Jacobsen Graphs are described in the Official Digest, September 1963, pp. 885-911.

The scattering coefficients for the coatings are recorded in Table IV.

ents for the blends are determined according to the procedure of Example 6. The results are recorded in Table VI.

TABLE IV

| Run No. | Polymer of Plastic Pigment[1] Type | Wt% | Average Diameter of Plastic Particles, Micron | Scattering Coefficient |
|---|---|---|---|---|
| 1* | Sty/IA | (99/1) | 0.12 | 0.103 |
| 2 | Sty/VCN/IA | (92/6/2) | 0.35 | 0.197 |
| 3 | Sty/VCN/IA | (92/6/2) | 0.45 | 0.230 |
| 4 | Sty/VCN/IA | (92/6/2) | 0.50 | 0.276 |
| 5 | Sty/VCN/IA | (92/6/2) | 0.70 | 0.242 |
| 6 | Sty/VCN/IA | (92/6/2) | 0.80 | 0.197 |
| 7* | Sty | (100) | 1.00 | 0.166 |
| 8* | Sty | (100) | 1.10 | 0.131 |
| 9* | Sty/DVB | (90/10) | 4.00 | NM** |
| 10* | Sty/DVB | (90/10) | 6-12 | NM** |

*Not an example of the invention.
**Not measurable using the Mitton Jacobsen Graphs.
[1]Sty-styrene, IA-itaconic acid, VCN-acrylonitrile, DVB-divinyl benzene As evidenced by the scattering coefficients for Run Nos. 1, 7, 8, 9 and 10 of Table IV, coatings of latex of polymer particles having average diameters outside the range of 0.3 to 0.8 micron have substantially lower scattering coefficients than do coatings containing particles having average diameter within the specified range and consequently have poorer opacity or hiding at equivalent coating weights.

EXAMPLE 7

Several blends are prepared of hydroxyethylated starch and a latex of non-film forming styrene/acrylic acid (97/3) copolymer having an average particle size of 0.49 micron and a second order glass transition temperature of 105°C in varying ratios calculated on solids basis as recorded in Table V. The solids contents of the blends are adjusted to 40 weight percent. The scattering coefficients for the several blends are determined according to the method described in Example 6 and are recorded in Table V. IGT Picking Resistance was also determined for the several blends in accordance with TAPPI Test Method T499 su 64 and the results are recorded in Table V.

TABLE V

| Run No. | Polymer to Starch Ratio Wt. Parts | Vol. Parts | Scattering Coefficient | IGT Picking Resistance, ft/min |
|---|---|---|---|---|
| A* | 38.5:1 | 38.8:0.73 | 0.506 | ** |
| B | 38.5:3 | 38.8:2.1 | 0.422 | 160 (No. 1 ink) |
| C | 38.5:5 | 38.8:3.5 | 0.412 | 255 (No. 2 ink) |
| D | 38.5:10 | 38.8:7 | 0.285 | 175 (No. 6 ink) |
| E | 38.5:15 | 38.8:10.5 | 0.193 | 305 (No. 8 ink) |
| F | 38.5:17 | 38.8:11.9 | 0.168 | 310 (No. 8 ink) |
| G* | 38.5:20 | 38.8:14 | 0.106 | 345 (No. 8 ink) |

*Not an example of the invention.
**Coating was so weak that a value could not be obtained.

A coating composition containing Kaolin clay and the starch binder in a volume ratio of 38.8 volume parts of clay to 7 volume parts of starch binder has a scattering coefficient of 0.168.

EXAMPLE 8

Several blends are prepared of ethylated starch and latexes of non-film forming vinyl benzoate/acrylic acid (97/3) copolymer having average particle sizes as indicated in Table VI in ratio of 7 volume parts of starch (binder) to 38.8 volume parts of copolymer particles (pigment). The solids contents of the blends are adjusted to 40 weight percent and the scattering coeffici-

TABLE VI

| Run No. | Average Diameter of the Plastic Particles, Micron | Scattering Coefficient |
|---|---|---|
| A* | 0.11 | 0.074 |
| C | 0.37 | 0.193 |
| D | 0.53 | 0.251 |
| E | 0.63 | 0.235 |
| F | 0.69 | 0.202 |

*Not an example of the invention.

EXAMPLE 9

Two blends are prepared of ethylated starch and latexes of non-film forming methyl methacrylate/butyl acrylate/methacrylic acid/acrylic acid (81/15/3/1) copolymer having average particle sizes as indicated in Table VII in ratio of 7 volume parts of starch (binder) to 38.8 volume parts of copolymer particles (pigment) calculated on a solids basis. The solids content of the blends are adjusted to 40 weight percent and the scattering coefficients for the blends are determined according to the procedure of Example 6. The results are recorded in Table VII.

TABLE VII

| Run No. | Average Particle Diameter, Micron | Scattering Coefficient |
|---|---|---|
| A* | 0.10 | 0.047 |
| B | 0.58 | 0.182 |

*Not an example of the invention.

EXAMPLE 10

Several blends are prepared of hydroxyethylated starch and a variety of latexes of non-film forming polymers as specified in Table VIII. The ratio of plastic particles to starch in each blend is 38.8 volume parts of plastic particles to 7 volume parts of starch. Scattering coefficients were determined for this blend in accordance with the procedure of Example 6. The results are recorded in Table VIII.

For purposes of comparison, a clay coating (Run No. C) is prepared having a ratio of 38.8 volume parts of clay to 7 volume parts of starch. The scattering coefficient is determined and recorded in Table VIII.

TABLE VIII

| Run. No. | Type of Pigment | Monomeric Composition of Latex Polymer, wt% | Average diameter of plastic Particles, Micron | Scattering Coefficient |
|---|---|---|---|---|
| 1 | Plastic | 100 styrene | 0.44 | 0.225 |
| 2 | Plastic | 97 Vinyl Toluene/ 3 Acrylic Acid | 0.60 | 0.199 |
| 3 | Plastic | 97 t-butylstyrene/ 3 Acrylic Acid | 0.71 | 0.255 |
| 4 | Plastic | 50 t-butylstyrene/ 47 Acrylonitrile/ 3 Acrylic Acid | 0.44 | 0.236 |
| 5 | Plastic | 60 Acrylonitrile/ 37 Styrene/ 3 Acrylic Acid | 0.83 | 0.192 |
| 6 | Plastic | 92 Styrene/ 6 Acrylonitrile/ 2 Itaconic Acid | 0.43 | 0.212 |
| 7 | Plastic | 85 Styrene/ 15 Acrylic Acid | 0.51 | 0.214 |
| C* | Clay | | | 0.168 |

*Not an example of the invention

EXAMPLE 11

Several blends are prepared each using one of a variety of binders as specified in Table IX and a latex of non-film forming styrene/acrylic acid (97/3) copolymer, the particles of which have an average diameter of 0.49 micron, in a ratio of 10 weight parts of binder to 38.5 weight parts of copolymer particles. Scattering coefficients for the blends are determined according to procedure used in Example 6. The results of these determinations are recorded in Table IX.

For purposes of comparison, blends of the same binders and clay in ratio of 15 weight parts of binder to 100 weight parts of clay are prepared as comparative blends. Scattering coefficients of these comparative blends are determined in accordance with the procedure of Example 6. The results are recorded in Table IX in parentheses adjacent to the corresponding blend of the binder and latex.

TABLE IX

| Run No. | Binder | Scattering Coefficients Plastic Particles | Clay |
|---|---|---|---|
| A | Hydroxyethylated Starch | 0.250 | (0.131) |
| B | Protein | 0.249 | (0.176) |
| C | Methyl Cellulose | 0.424 | (0.155) |
| D | Styrene/Butadiene Copolymer | 0.267 | (0.141) |
| E | Polyvinyl acetate | 0.278 | (0.149) |
| F | Polyvinyl alcohol | 0.194 | (0.081) |
| G | Casein | 0.258 | (0.181) |
| H | Ethyl acrylate/acrylic acid copolymer | 0.277 | (0.154) |

EXAMPLE 12

Several coating compositions are prepared using a binder as indicated in Table X and styrene/acrylic acid copolymer (97/3) particles as the pigment. The particles of the coating compositions have average diameters as indicated in Table X. The several coating compositions have a ratio of 38.8 volume parts of pigment to 7 volume parts of binder. The scattering coefficients of the coating compositions are measured in the manner set forth in Example 6, and the results are recorded in Table X.

Scattering coefficients of compositions having clay as pigment to binder ratio on a volume basis equivalent to the preceding compositions are also determined and recorded in Table X.

TABLE X

| | Pigment | | Scattering Coefficient | | |
|---|---|---|---|---|---|
| Run No. | Type | Average Diameter | Starch(a) | S/B Latex(b) | Acetate(c) |
| 1* | Plastic Particles | 0.14 | 0.105 | 0.137 | 0.093 |
| 2 | Plastic Particles | 0.37 | 0.235 | 0.289 | 0.290 |
| 3 | Plastic Particles | 0.41 | 0.266 | 0.334 | 0.306 |
| 4 | Plastic Particles | 0.47 | 0.267 | 0.333 | 0.292 |
| 5 | Plastic Particles | 0.53 | 0.259 | 0.316 | 0.301 |
| 6 | Plastic | 0.77 | 0.227 | 0.261 | 0.346 |

TABLE X-continued

| Run No. | Pigment Type | Pigment Average Diameter | Scattering Coefficient Starch(a) | Scattering Coefficient S/B Latex(b) | Scattering Coefficient Acetate(c) |
|---|---|---|---|---|---|
| D* | Particles Clay | — | 0.168 | 0.186 | 0.179 |

*Not an example of the invention
(a)hydroxyethylated starch
(b)styrene/butadiene latex
(c)polyvinyl acetate latex

EXAMPLE 13

Several coating compositions are prepared using a starch binder and a pigment of clay, styrene/acrylic acid copolymer of Example 7 or combination thereof as indicated in Table XI. The coating compositions are tested as indicated in Table XI and the results are recorded.

TABLE XI

| Run No. | Clay/Plastic Particle/Starch Ratio, volume parts | Solids Wt % | Viscosity(1), cps | Scattering Coefficient(2) | Coating Weight(3), lbs/book ream | Brightness(4) |
|---|---|---|---|---|---|---|
| 1* | 100/0/17.2 | 55.0 | 1370 | 0.162 | 10.0 | 76.6 |
| 2 | 97.5/2.5/17.2 | 54.7 | 1370 | 0.173 | 9.6 | 76.9 |
| 3 | 95/5/17.2 | 54.3 | 1270 | 0.167 | 9.6 | 76.8 |
| 4 | 90/10/17.2 | 53.6 | 1270 | 0.178 | 9.5 | 77.0 |
| 5 | 85/15/17.2 | 52.9 | 1430 | 0.184 | 9.3 | 78.0 |
| 6 | 75/25/17.2 | 51.4 | 1350 | 0.200 | 8.6 | 78.3 |
| 7 | 50/50/17.2 | 47.2 | 1320 | 0.224 | 7.5 | 79.6 |
| 8 | 25/75/17.2 | 42.1 | 1180 | 0.255 | 6.0 | 80.9 |
| 9 | 10/90/17.2 | 38.6 | 1130 | 0.262 | 5.0 | 81.5 |
| 10 | 0/100/17.2 | 36.0 | 1030 | 0.286 | 4.6 | 81.4 |

(1)Brookfield viscosity at room temperature and 20 rpm.
(2)Scattering Coefficient determined by procedure of Example 6.
(3)Coating weight in pounds per book ream [500 pages (25" × 38") per book ream].
(4)TAPPI Test Method T452-M-58.

| Run No. | K&N Ink(5), % drop | Opacity(6) | IGT Pick Resistance(7), ft/min. |
|---|---|---|---|
| 1* | 42.2 | 90.6 | 220 |
| 2 | 45.1 | 90.2 | 170 |
| 3 | 43.8 | 90.1 | 200 |
| 4 | 43.2 | 90.1 | 200 |
| 5 | 44.4 | 89.8 | 250 |
| 6 | 43.8 | 89.7 | 280 |
| 7 | 42.9 | 89.4 | 250 |
| 8 | 42.1 | 89.3 | 270 |
| 9 | 41.2 | 88.2 | 280 |
| 10 | 40.8 | 88.4 | >450 (200) |

*Not an example of the invention.
(5)TAPPI Test Method RC 19.
(6)TAPPI Test Method T425-M-60.
(7)TAPPI Test Method T499 su 64 using "A" Tension, 35 kilograms pressure and No. 5 ink except in Run No. 10 the value reported in parentheses represents test with No. 6 ink.

What is claimed is:

1. A coated paper comprising
   A. a paper substrate having intimately adhered thereto;
   B. an improved coating comprising a binding amount of a binder and an opacifying amount of a pigment, provided that (1) the ratio of binder to pigment is in the range from about 1.3 to about 12 volume parts of binder to about 38.8 volume parts of pigment and (2) at least a portion of said pigment being in the form of discrete, substantially spheroidal, water- and binder-insoluble, non-film forming, polymeric plastic particles having an average diameter of from about 0.3 to about 0.8 micron, said portion of plastic particles constituting at least about 1 volume percent based on total pigment and being sufficient to impart improved coating properties as compared to a coating containing only inorganic pigment; and
   C. printing applied to a side of the resulting coated paper substrate on which said coating has been previously applied.

2. The coated paper according to claim 1 wherein ratio of binder to pigment is from about 1.3 to about 12 volume parts binder to about 38.8 volume parts of pigment.

3. The coated paper according to claim 2 wherein the plastic particles comprise a substantially colorless, thermoplastic, addition polymer.

4. The coated paper according to claim 2 wherein the polymer consists essentially of (a) from about 40 to about 100 weight percent of an ethylenically unsaturated monomer selected from the group consisting of monovinylidene carboxylic aromatic monomers; esters of $\alpha,\beta$-ethyleneically unsaturated carboxylic acids which polymerize to form non-film forming polymers; ethylenically unsaturated esters of non-polymerizable carboxylic acids which polymerize to form non-film forming polymers; $\alpha,\beta$-ethylenically unsaturated nitriles; halogenated aliphatic $\alpha$-monoolefins, and mixtures thereof; (b) from 0 to 45 weight percent of an ethylenically unsaturated soft monomer selected from the group consisting of conjugated aliphatic dienes, alkyl acrylates, unsaturated esters of saturated carboxylic acid which polymerize to form film-forming polymers, esters and half esters of $\alpha,\beta$-ethylenically unsaturated polycarboxylic acids, vinylidene chloride, and mixtures thereof and (c) from 0 to about 25 weight percent of α,β-ethylenically unsaturated carboxylic acid monomer.

5. The coated paper according to claim 3 wherein the polymer consists essentially of from about 75 to about 100 weight percent of ethylenically unsaturated monomer selected from the group consisting of monovinylidene carbocyclic aromatic monomer, methyl methacrylate, vinyl chloride, vinyl benzoate, acrylonitrile and mixtures thereof, from 0 to about 20 weight percent of ethylenically unsaturated soft monomer selected from group consisting of conjugated aliphatic dienes, alkyl acrylates, unsaturated esters of saturated carboxylic acids which polymerize to form film-forming polymers and mixtures thereof and from 0 to about 5 weight percent of α,β-ethylenically unsaturated carboxylic acid monomer having from 3 to 8 carbon atoms.

6. The coated paper according to claim 2 wherein the polymer consists essentially of from about 75 to about 99 weight percent of monovinylidene carbocyclic aromatic monomer, from 0 to about 20 weight percent of acrylonitrile and from about 1 to about 5 weight percent of α,β-ethyleneically unsaturated carboxylic acid selected from the group consisting of acrylic acid, methacrylic acid, itaconic acid, maleic acid, maleic anhydride and mixtures thereof.

7. The coated paper according to claim 5 wherein monovinylidene carbocyclic aromatic monomer is styrene.

8. The coated paper according to claim 5 wherein at least 50 volume percent of the plastic particles have diameters in the range from about 0.2 to about 0.9 micron.

9. The coated paper according to claim 5 wherein the binder is selected from the group consisting of modified starch, polyvinyl acetate and styrene/butadiene copolymer.

10. The coated paper according to claim 5 wherein the pigment consists of at least about 1 weight percent of plastic particles and a remaining portion of inorganic pigment.

11. The coated paper according to claim 10 wherein the inorganic pigment is clay.

12. The coated paper of claim 1 wherein the polymer is a polymer of methyl methacrylate.

13. The coated paper of claim 12 wherein the polymer is a methyl methacrylate/butyl acrylate/methacrylic acid/acrylic acid copolymer.

14. The coated paper of claim 1 wherein the polymer is a polymer of vinyl benzoate.

15. The coated paper of claim 14 wherein the polymer is a vinyl benzoate/acrylic acid copolymer.

16. The coated paper of claim 1 wherein the ratio of binder to pigment is from about 6 to about 10 volume parts of binder to about 38.8 volume parts of pigment.

* * * * *